United States Patent
Dutta et al.

(10) Patent No.: US 12,494,919 B2
(45) Date of Patent: Dec. 9, 2025

(54) SYSTEM AND METHOD FOR SECURE MESSAGING IN A TELECOMMUNICATIONS NETWORK

(71) Applicant: JIO PLATFORMS LIMITED, Ahmedabad (IN)

(72) Inventors: Debashis Dutta, Navi Mumbai (IN); Chandan Maity, Navi Mumbai (IN); Shivraj Dagadi, Bangalore (IN); Anish Shah, Mumbai (IN)

(73) Assignee: JIO PLATFORMS LIMITED, Ahmedabad (IN)

( * ) Notice: Subject to any disclaimer, the term of this patent is extended or adjusted under 35 U.S.C. 154(b) by 0 days.

(21) Appl. No.: 18/246,510

(22) PCT Filed: Jan. 24, 2023

(86) PCT No.: PCT/IB2023/050575
§ 371 (c)(1),
(2) Date: Mar. 23, 2023

(87) PCT Pub. No.: WO2023/144689
PCT Pub. Date: Aug. 3, 2023

(65) Prior Publication Data
US 2024/0333520 A1    Oct. 3, 2024

(30) Foreign Application Priority Data
Jan. 25, 2022  (IN) .............. 202221004235

(51) Int. Cl.
*H04L 9/32* (2006.01)
*H04L 9/08* (2006.01)
*H04W 4/14* (2009.01)

(52) U.S. Cl.
CPC .......... *H04L 9/3247* (2013.01); *H04L 9/0825* (2013.01); *H04W 4/14* (2013.01)

(58) Field of Classification Search
CPC ....... H04L 9/3247; H04L 9/0825; H04W 4/14
See application file for complete search history.

(56) References Cited

U.S. PATENT DOCUMENTS

| | | |
|---|---|---|
| 2014/0086177 A1 | 3/2014 | Adjakple et al. |
| 2020/0211004 A1* | 7/2020 | Ng ................. G06Q 20/3829 |

(Continued)

FOREIGN PATENT DOCUMENTS

| | | |
|---|---|---|
| GB | 2384392 A | 7/2003 |
| WO | 2014052750 A2 | 4/2014 |

OTHER PUBLICATIONS

International Search Report and Written Opinion issued by the International Searching Authority, in related Foreign Application No. PCT/IB2023/050575, dated Apr. 18, 2023, 9 pages.

*Primary Examiner* — Esther B. Henderson
(74) *Attorney, Agent, or Firm* — FINNEGAN, HENDERSON, FARABOW, GARRETT & DUNNER LLP.

(57) ABSTRACT

The present disclosure provides an effective solution to an entity or an organization by enabling an end-to-end system or method of delivering secure messages. The system provides a unique way of securely delivering messages or information to a user only after proper user authentication. Hence, security attacks in mobile communication are avoided (such as SIM swapping and the like). Additionally, the system and method of secure messaging is mobile phone operating system (OS) agnostic.

18 Claims, 13 Drawing Sheets

(56) References Cited

U.S. PATENT DOCUMENTS

| | | | |
|---|---|---|---|
| 2020/0287907 A1* | 9/2020 | Park | H04L 67/30 |
| 2023/0327884 A1* | 10/2023 | Verheul | H04L 9/0866 |
| | | | 713/168 |

\* cited by examiner

SYSTEM AND METHOD FOR SECURE MESSAGING IN A TELECOMMUNICATIONS NETWORK

RESERVATION OF RIGHTS

A portion of the disclosure of this patent document contains material, which is subject to intellectual property rights such as but are not limited to, copyright, design, trademark, integrated circuit (IC) layout design, and/or trade dress protection, belonging to Jio Platforms Limited (JPL) or its affiliates (hereinafter referred as owner). The owner has no objection to the facsimile reproduction by anyone of the patent document or the patent disclosure, as it appears in the Patent and Trademark Office patent files or records, but otherwise reserves all rights whatsoever. All rights to such intellectual property are fully reserved by the owner.

FIELD OF INVENTION

The embodiments of the present disclosure generally relate to systems and methods for facilitating secure messaging in mobile communication systems. More particularly, the present disclosure relates to a system and a method for secure messaging in a telecommunications network.

BACKGROUND OF INVENTION

The following description of the related art is intended to provide background information pertaining to the field of the disclosure. This section may include certain aspects of the art that may be related to various features of the present disclosure. However, it should be appreciated that this section is used only to enhance the understanding of the reader with respect to the present disclosure, and not as admissions of the prior art.

With advancements in technology and automation in place, improved services are provided to end customers. Mobile devices are utilized to provide services to customers. Almost every solution provider is moving towards smartphone-based interface associated with the mobile device. As a key facilitator of technologies and services, mobile devices play an important role and work as a medium of communication between customers and service providers.

With the ever-increasing demand for rendering services, service providers have been constantly putting efforts to modify their applications. At the same time, it is critical to ensure the end-to-end security of these digital services and solutions. It is well known that security is an umbrella under which many sensitive aspects or parameters of a system or solution need to be catered to. Some of these parameters (not limited though) include security of data at rest as well as data in transit, user authentication, data confidentiality, data integrity, and key management systems. In any secure solution, the following are the fundamental aspects of security:
- Authentication
- Integrity
- Confidentiality
- Non-repudiation (to strengthen legal framework)

Many security standards and practices are being used to fortify digital solutions. For example, secure socket layer/transport layer security (SSL/TLS) is used to ensure server authentications and provide a mechanism of an encrypted secure channel between a client and a server. Communicating sensitive information in a secure way that instils confidence in end users, solution providers, system integrators, business partners, and governments. With the integration of telecommunications and information technology, a one-time password (OTP) or security code wrapped in a short messaging service (SMS) is extensively used as a second factor or as an out-of-band (OOB) authentication method for providing an extra layer of security. The OOB authentication is a two-factor authentication (2FA) that requires a secondary verification method through a separate/different communication channel than a primary communication channel. The OOB authentication is used by financial institutions and other organizations with high-security requirements to prevent unauthorized access. Transactions include OTPs transmitted over telecommunication channels as part of the OOB channel authentication system.

At present, SMS is used for various purposes, which can be classified into two broad groups: sensitive SMS and non-sensitive SMS. Apart from traditional plain text user data (non-sensitive SMS) transfer, SMS is being used for sensitive information sharing where the possession of mobile devices with a subscriber identity module (SIM) card is necessary. A few of those application usages are:

Mobile number or user verification by sending a secret code to a specific mobile number or user. Mobile number or user verification is primarily used in various software service-based user account creations or linking the mobile number with services.

Alternate channel verification or OOB authentication or 2FA is achieved by sending a secret code. OOB is primarily used for user account log-in in various software services where the mobile number is linked with other user information (such as username, password, email ID, etc.).

Transaction authorization by sending secret code is primarily used in software-based banking service systems. Users need to give consent by providing the same digital secret code (shared over mobile number) to the system. In an absence of proper security protection, the digital secret codes may be vulnerable, and thus, prone to be captured by attackers. Hence, there is a need to provide secure ways of communicating sensitive information.

FIG. 1 depicts an existing process in which sensitive SMS containing OTP, personal identification number (PIN), secret code, etc. is sent by an application or service provider through a plain text SMS. There are mainly five entities involved in the entire process, which are marked in FIG. 1 from 1 to 5. The following steps are involved in the authentication process.

Step-A: A user triggers a local or remote service (login, signup, transaction, etc.) that warrants a sensitive SMS. The mobile number of the user may be collected by the service at the same time or by other means before sending the sensitive information through SMS.

Step-B: The service or application providers generate and store sensitive information in the form of a random number (also called OTP). Further, third parties provide the service of OTP generation and verification. In such cases, end application providers rely on third parties to provide the result of authentication.

Step-C: Once the random number, i.e., OTP is generated and kept safe in the memory of the application provider/third party, the OTP is further wrapped into a plain-text SMS and sent to the target mobile number of the user with the help of a mobile network operator (MNO), SMS gateway, or service. Furthermore, in conventional technical process of SMS transfer, there is no differentiation between sending a non-sensitive SMS or sensitive SMS, i.e., both are sent in plain-text format. The SMS is encrypted within the boundary of the MNO. However, once the SMS is terminated at the receiving mobile device, it has to be decrypted and presented in plain text to the user directly through the receiving mobile device.

Step-D: The user receives the SMS and the OTP (in plain-text format), and manually enters the same into a user interface (UI) provided by the service provider. In some cases, the application or service itself extracts the OTP from the SMS inbox memory of the SIM card, and automatically fills the appropriate field.

Once the sensitive information or OTP is entered into the UI, the OTP is sent back to the service or application provider or third-party OTP provider where it gets compared with the originally sent OTP stored in the memory of the service provider. If the OTPs do not match, then the user will not be authenticated and corresponding actions will be taken. Else, the user is declared as authenticated and the transaction will be authorized. Similar processes are adopted for communicating user verification codes, device confirmation codes, and other such sensitive information.

Further, a general hardware block diagram of modern mobile phone is depicted in FIG. 2 where the relevant components are depicted to understand the hardware system.

SIM card (11)
Cellular baseband (13)
Cellular radio frequency (RF) transceiver (16)
Application processor (17)

Any data (text, call, etc.) is generally received or sent by the cellular RF transceiver (16) which is responsible for RF communication with a mobile operator's base station. The RF transceiver (16) is the first interface with the mobile network for receiving information. The cellular baseband (13) is a key processor in any mobile phone which takes care of RF communication, analog-to-digital (ADC) conversions, and digital-to-analog (DAC) conversions for sending and receiving data over a mobile network, for example, a global system for mobile communication (GSM). The cellular baseband (13) is also responsible for managing communication with upper layers in the mobile phone through middleware libraries. Further, the cellular baseband (13) communicates to the SIM card (11) using the ISO 7816 protocol.

All types of communications (data and control) are taken care of by a baseband system. For example, whenever there is an event available at the baseband system like an incoming call, incoming message, etc., the baseband system notifies the event to an operating system's upper layers and communicates with a short messaging service center (SMSC).

FIG. 3 illustrates an exemplary representation of a telephony stack downward communication. A radio interface layer (RIL) provides abstraction between the telephony system (25) and radio hardware. As shown in FIG. 3, a stack of different layers shows the flow of mobile-originated SMS through different layers. The flow starts when the user creates an SMS in the application layer and sends it to a recipient's mobile number. An SMS flow originates from the upper layers of the system to the lower layers and is finally sent out by the radio hardware.

Similarly, as shown in FIG. 4, an upward flow of an SMS is depicted where an SMS is received by the baseband (71), processed, and sent upward to finally reach the user. The baseband processor plays a key role in deciding the direction of the received SMS from the network. Either the received message can be sent to the user through the system or the message can be routed towards the SIM card by using envelop commands at the baseband itself. This way, there are certain types of messages which can directly be sent to a SIM card.

In typical mobile communication systems, apart from the telecommunications network, the logical, physical entities of a mobile station are depicted in FIG. 5. The mobile station or user equipment (UE) (81) includes the entire mobile device and the SIM card (85). Further, mobile termination (MT) (82) is a part of the baseband that is responsible for communication with the cellular network. Additionally, the MT (82) manages the modulation and demodulation of signals, analog-to-digital (ADC) conversions, and digital-to-analog (DAC) conversions.

The MT (82) is also responsible for communicating with the SIM card (85) using a standard ISO 7816 communication protocol interface (87). Further, the MT (82) interacts with terminal equipment (83) which is generally a mobile phone including operating system (OS) and an application processor.

The SIM card (85) is a tamper-resistant cryptographic module, which stores network authentication and user authentication material, and processes various commands. The SIM card (85) is also used by MNOs to update or control user communication with the telecommunications network. Higher layers in terminal equipment (83) manage the SIM (85) through mobile termination (MT) (82).

SMS remains a very popular communications medium and is increasingly found on remote sensors, critical infrastructure, and vehicles. Due to an abundance of cellular coverage, SMS is widely used, as data availability is more important than real-time operation. To mobile users, SMS means a basic 160 characters of a printable text message. To carriers and developers, SMS offers a much more powerful range of options, with sizes up to a theoretical maximum of 35 kilobytes. SMS is a universal text messaging system, which allows the transmission of messages containing printable and non-printable characters to be sent to or from a GSM mobile station (MS). The SMS message, as specified by the European Telecommunication Standards Institute (ETSI) organization in documents GSM 03.40 [86] and GSM 03.38 [87], can be up to 160 characters long, where each character is 7 bits according to the 7-bit default alphabet. Eight-bit messages (maximum 140 characters) are usually not viewable by phones as text messages. Instead, the messages are used for data in smart messaging (images and ringing tones). 16-bit messages (maximum 70 characters) are used for unicode. Further, SMS is characterized by an out-of-band packet delivery and low-bandwidth message transfer, which results in a highly efficient means for transmitting short bursts of data. Message delivery forms part of the GSM infrastructure where every SMS needs to pass through an SMSC.

The benefit of an SMS to a user revolves around convenience, flexibility, and the seamless integration of a complete messaging solution. SMS works on a store-and-forward basis and when received, is usually stored on the SIM card or in the mobile station's internal store. An SMS consists of the following elements as shown in below table 1:

TABLE 1

| S. No. | Field | Remarks |
|---|---|---|
| 1. | Header | Identifies the type of message |
| 2. | Service Centre Timestamp | The time at which SMS reaches SMSC |
| 3. | Originating Address | Mobile number of the sender |
| 4. | Protocol Identifier | Element by which the originator of a short message (either an SC or an MS) may refer to a higher-layer protocol |
| 5. | Data Coding Scheme | the character set or message coding, which determines the encoding of the message user data<br>the message class, which determines to which component of the MS or UE the message should be delivered<br>the request to automatically delete the message after reading<br>the state of flags indicating the presence of unread voicemail, fax, e-mail, or other messages<br>the indication that the message content is compressed<br>the language of the cell broadcast message |
| 6. | User Data Length | The length of the message |
| 7. | User Data | The message (bytes: 160 7-bit characters, 140 8-bit characters, or 70 16-bit characters) |

FIG. 6 illustrates an SMS flow. The SMS is transferred in a connectionless packet mode over a signaling channel of a telecommunications network. Once a message is sent, the message is received by an SMSC (92), which must then send the message to the appropriate recipient's mobile phone (93) through a telecommunications network. The messages travel between several network nodes before being delivered. The sender of a mobile terminating (MT) message is charged for sending the SMS. When a message is sent from the sender's mobile phone (91) as shown in FIG. 6, it reaches the SMSC (92) through the path (94) known as an SMS-Submit type. Once the message is received at the SMSC (92), the SMSC (92) sends back a submission report (95) to the sender's mobile phone (91). Further, the SMSC (92) sends the message to the recipient (93) through a path (97), which is also called the SMS-Deliver type. Once the recipient (93) receives the message, the recipient's mobile phone (93) sends a delivery report (98) to the SMSC (92). Finally, the SMSC (92) sends a final status report (96) of the same message to the sender's mobile phone (91). Hence, an end-to-end process of sending and receiving messages between two users of the SMSC (92) is achieved.

It may be appreciated that classes identify the importance of an SMS and the location where it must be stored.

Class 0 type of SMS message is displayed on a mobile screen without being saved in a message store or on the SIM card unless explicitly saved by the mobile user. Class 0 type of SMS is also called "Flash SMS" and is offered by third-party services to protect an OTP from UE application-level threats. However, the Class 0 SMS cannot be protected against SIM-swapping or operating system (OS) layer security breaches.

Class 1 type of SMS message is stored in the device memory or the SIM card (depending on memory availability) and is the most used SMS format at the user level.

Class 2 type carries SIM card data. The mobile terminal must ensure that the SIM card data is successfully transferred to SIM before it sends an acknowledgment (ACK) to SMSC. Class 2 type is normally used by MNOs for SIM applet level updates or communications such as SIM-OTA (Over-the-Air) service.

Class 3 type of message is forwarded from a receiving entity to an external device. The delivery acknowledgment is sent to the SMSC regardless of whether the message was forwarded to the external device.

Generally, Class 1 type SMS having OTPs is used for authentication of a band channel. However, even though the 2FA is widely and extensively used in many applications, and services for user authentication, the 2FA methods are prone to cyber-attacks. A compromised sensitive data or OTP may lead to many security vulnerabilities including changing passwords of all the accounts like mail, banking, social media, government services, and cloud services. The compromise of sensitive data or OTP may happen in many ways such as (but not limited to):

The OTP-generating server or service may be compromised.

The storage server of OTP data (valid for a few minutes) may be compromised.

For normal SMS, the mobile phone OS can always access the SMS independent of its sensitivity and can pose a potential threat for critical use cases.

For normal SMS, any malicious application having illegal access to capture screen, read notifications may intercept or steal SMS without the knowledge of owner of the device.

SIM swap attacks may occur where an attacker gets the victim's SIM profile by either tricking someone from the MNO organization or by producing fake ID documents and KYC details of legitimate subscriber at the SIM distribution centres. Hence, the attacker may access all the sensitive authentication details like OTP/SMS sent to the victim's mobile number.

The OTP may be compromised if the generation algorithm is leaked by any means. A weak algorithm for generating authentication code/OTP may also be vulnerable as it can easily be guessed.

Other than OTP/SMS, communicating any sensitive information and ensure that only legitimate user receives it and uses it for authentication/authorization etc., is a challenge.

The above list of vulnerabilities or attacks is not exhaustive. Additionally, vulnerabilities pose security threats to many users and at the same time provide challenges to service or application providers in distributing valuable services to their customers. Being the critical authentication mechanism adopted by many applications and services, OTP security becomes extremely important.

There is, therefore, a need in the art to provide a system and a method that can facilitate and integrate privacy-preserving components and mitigate the problems associated with the prior arts.

OBJECTS OF THE INVENTION

Some of the objects of the present disclosure, which at least one embodiment herein satisfy are listed herein below.

It is an object of the present disclosure to provide a system and a method that provides security against attacks such as SIM swap attacks, etc.

It is an object of the present disclosure to provide a system and a method that protects the direct revealing of sensitive information such as one-time password (OTP) by enforcing another level of user authentication.

It is an object of the present disclosure to provide a system and a method that is mobile platform agnostic.

It is an object of the present disclosure to provide a system and a method that is easily pluggable with the existing infrastructure of telecommunications and information technology.

SUMMARY

This section is provided to introduce certain objects and aspects of the present disclosure in a simplified form that are further described below in the detailed description. This summary is not intended to identify the key features or the scope of the claimed subject matter.

In an aspect, the present disclosure relates to a system for generating one or more secure messages. The system may include one or more processors operatively coupled to one or more computing devices. The one or more computing devices may be associated with one or more users, and may be connected to the one or more processors through a network. The one or more processors may be coupled with a memory that stores instructions to be executed by the one or more processors. The one or more processors may transmit one or more digitally signed requests to a service provider through the network. The one or more digitally signed requests may be indicative of one or more services requested by the one or more users through one or more computing devices, where the one or more computing devices comprise a subscriber identity module (SIM) card. Further, the one or more processors may receive one or more encrypted messages from the service provider. The one or more encrypted messages may be based on the one or more digitally signed requests. Additionally, the one or more processors may authenticate the one or more users based on the one or more encrypted messages received from the service provider. The authentication may be based on one or more keys. Further, the one or more processors may, based on the authentication of the one or more users, decrypt the one or more encrypted messages received from the service provider using one or more techniques to generate one or more decrypted messages. Furthermore, the one or more processors may generate one or more secure messages based on the one or more decrypted messages.

In an embodiment, the one or more techniques may include any or a combination of asymmetric key cryptography, one or more digital signatures, and one or more X 5.09 certificates.

In an embodiment, the one or more decrypted messages may include one or more plain text messages to be read by the one or more users.

In an embodiment, the one or more processors may be configured to use one or more public key infrastructure (PKI) enabled cryptography features of the SIM card to authenticate the one or more users.

In an embodiment, the service provider may be configured to validate the one or more digitally signed requests and generate the one or more encrypted messages.

In an embodiment, the one or more encrypted messages may be received from the service provider through a mobile network operator (MNO). The MNO may be configured to process the one or more encrypted messages and generate one or more short message services (SMS).

In an embodiment, the MNO may be configured to generate one or more Class 2 SMS.

In an embodiment, the one or more keys may include one or more personal identification number (PINs) set by the one or more users.

In an embodiment, the one or more digitally signed requests may be associated with one or more encryption standards.

In an embodiment, the service provider may be configured to validate the one or more digitally signed requests using a public key and a valid digital certificate.

In an embodiment, the service provider may include a certificate authority/public key infrastructure (CA/PKI) to generate the one or more encrypted messages.

In an embodiment, the one or more encrypted messages received from the service provider may be generated using an elliptical curve cryptography (ECC) encryption standard.

In an aspect, the present disclosure relates to a method for secure messaging. The method may include transmitting, by one or more processors, one or more digitally signed requests to a service provider through a network. The one or more digitally signed requests may be indicative of one or more services requested by one or more users through one or more computing devices, where the one or more computing devices comprise a SIM card. The method may include receiving, by the one or more processors, one or more encrypted messages from the service provider. The one or more encrypted messages may be based on the one or more digitally signed requests. The method may include authenticating, by the one or more processors, the one or more users based on the one or more encrypted messages received from the service provider. The authentication may be based on one or more keys. Further, based on the authentication, the method may include decrypting, by the one or more processors, the one or more encrypted messages received from the service provider using one or more techniques. Additionally, the method may include generating, by the one or more processors, one or more decrypted messages. Furthermore, the method may include generating, by the one or more processors, one or more secure messages based on the one or more decrypted messages.

In an embodiment, the one or more techniques may include any or a combination of asymmetric key cryptography, one or more digital signatures, and one or more X 5.09 certificates.

In an embodiment, the method may include transmitting, by the one or more processors, the one or more digitally signed requests associated with one or more encryption standards.

In an embodiment, the method may include validating, by the one or more processors, the one or more digitally signed requests, and generating, by the one or more processors (202) the one or more encrypted messages.

In an aspect, the present disclosure relates to a user equipment (UE) for facilitating generation of one or more secure messages. The UE may include one or more processors communicatively coupled to one or more processors in a system, where the one or more processors are coupled with a memory, and the memory stores instructions which when executed by the one or more processors causes the UE to transmit one or more digitally signed requests to a service provider through a network, where the one or more digitally signed requests are indicative of one or more services requested by one or more users associated with the UE. The one or more processors in the system may be configured to receive one or more encrypted messages from the service provider, where the one or more encrypted messages are based on the one or more digitally signed requests, authenticate the one or more users based on the one or more encrypted messages received from the service provider, where the authentication is based on one or more keys, based on the authentication, decrypt the one or more encrypted messages received from the service provider using one or more techniques and generate one or more decrypted messages, and generate the one or more secure messages based on the one or more decrypted messages. Other than STK, there may be one or more direct or indirect communication methods between SIM and application provider backend via MNO or MNO designated gateway or third party gateway or any other direct message facility.

In an embodiment, the UE may include a SIM card operably coupled to the one or more processors to enable the transmission of the one or more digitally signed requests to the service provider through the network.

In an aspect, a subscriber identity module (SIM) card in a UE for generating one or more secure messages may include one or more processors operatively coupled to one or more processors in a system. The one or more processors may be coupled with a memory that stores instructions to be executed by the one or more processors and may cause the one or more processors to transmit one or more digitally signed requests to a service provider through a network, where the one or more digitally signed requests are indicative of one or more services requested by one or more users associated with the UE. The one or more processors may receive one or more encrypted messages from the service provider. The one or more encrypted messages may be based on the one or more digitally signed requests. The one or more processors may authenticate the one or more users based on the one or more encrypted messages received from the service provider. The authentication may be based on one or more keys. The one or more processors may, based on the authentication of the one or more users, decrypt the one or more encrypted messages received from the service provider using one or more techniques to generate one or more decrypted messages. The one or more processors may generate the one or more secure messages based on the one or more decrypted messages.

BRIEF DESCRIPTION OF DRAWINGS

The accompanying drawings, which are incorporated herein, and constitute a part of this disclosure, illustrate exemplary embodiments of the disclosed methods and systems in which like reference numerals refer to the same parts throughout the different drawings. Components in the drawings are not necessarily to scale, emphasis instead being placed upon clearly illustrating the principles of the present disclosure. Some drawings may indicate the components using block diagrams and may not represent the internal circuitry of each component. It will be appreciated by those skilled in the art that disclosure of such drawings includes the disclosure of electrical components, electronic components, or circuitry commonly used to implement such components.

Figure 1:
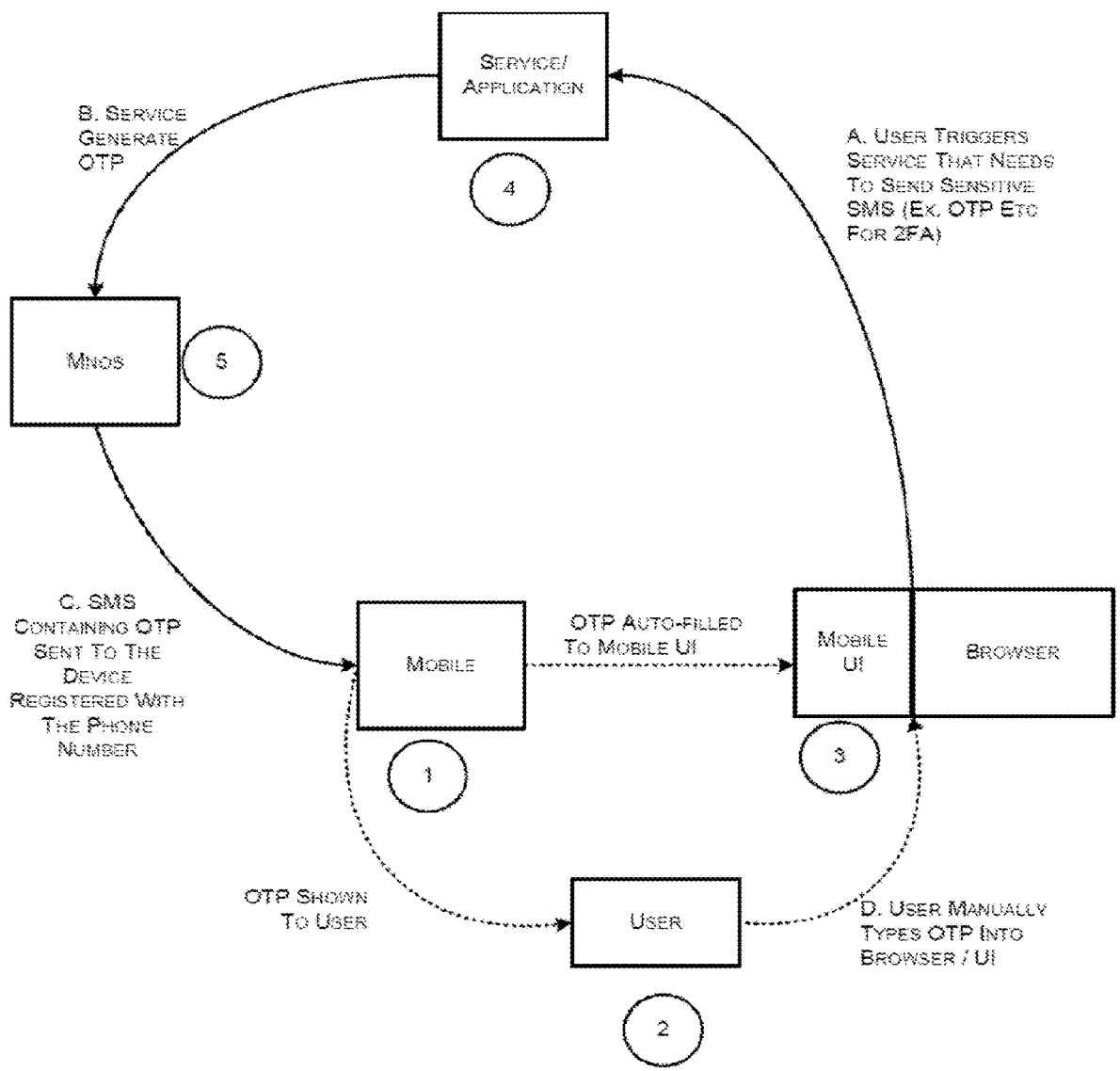
FIGS. 1-6 illustrate exemplary representations of sensitive information sharing using a one-time password (OTP) in short messaging services (SMS).
Figure 2:
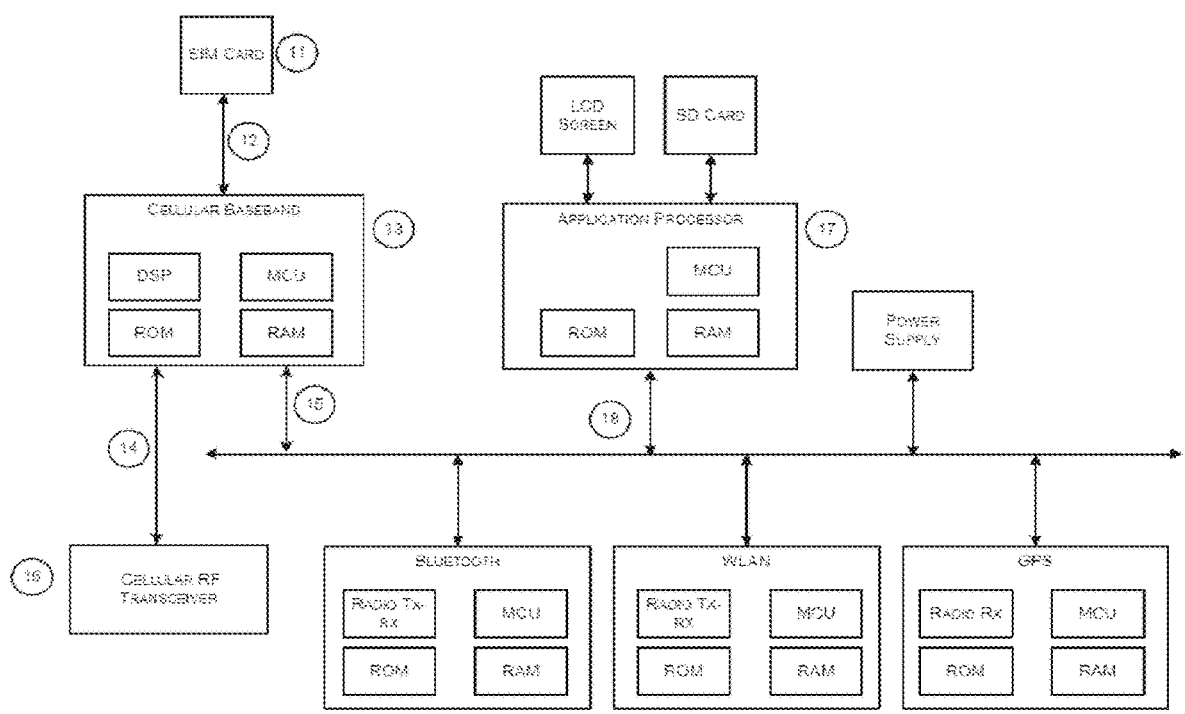
Figure 3:
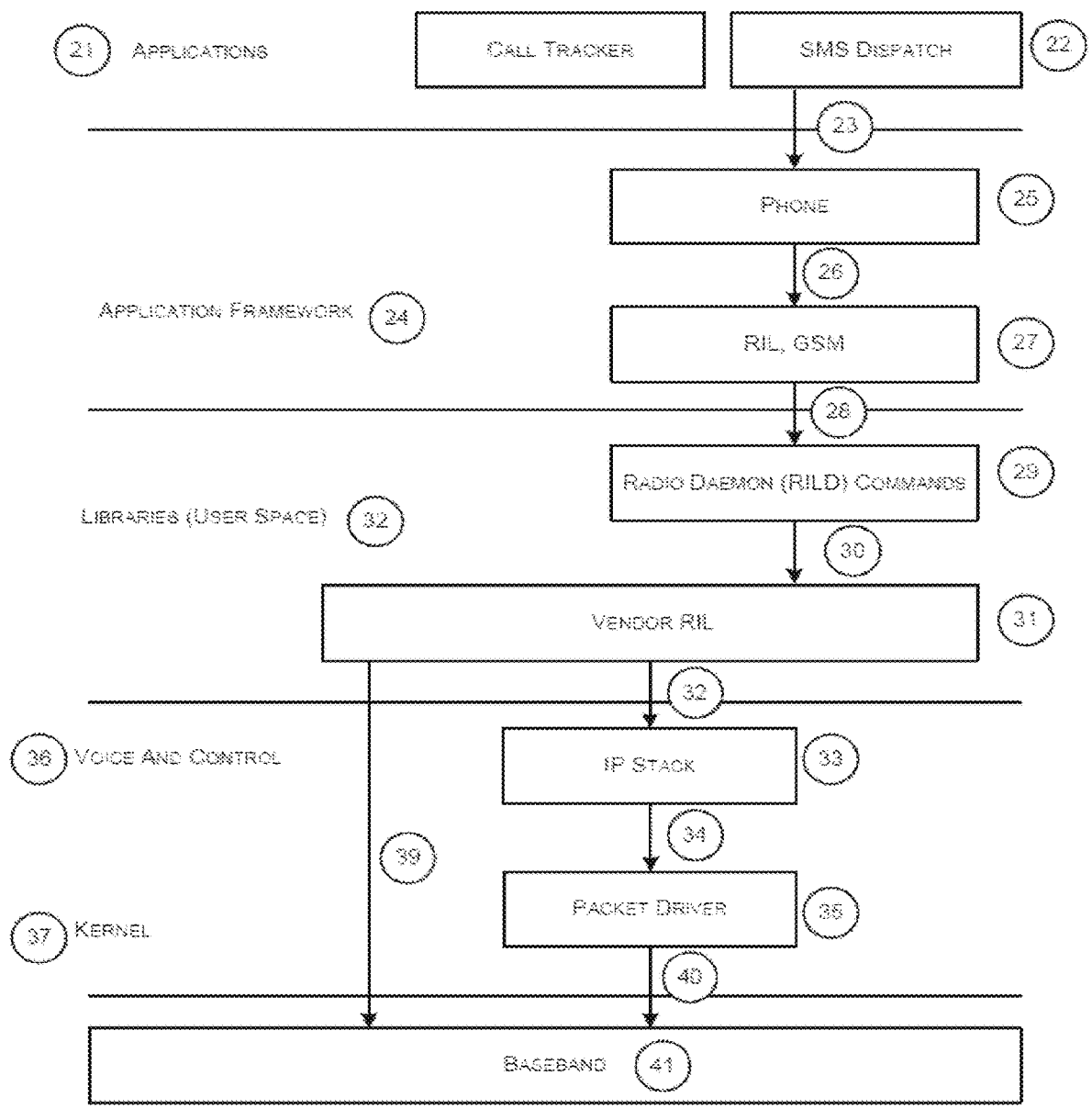
Figure 4:
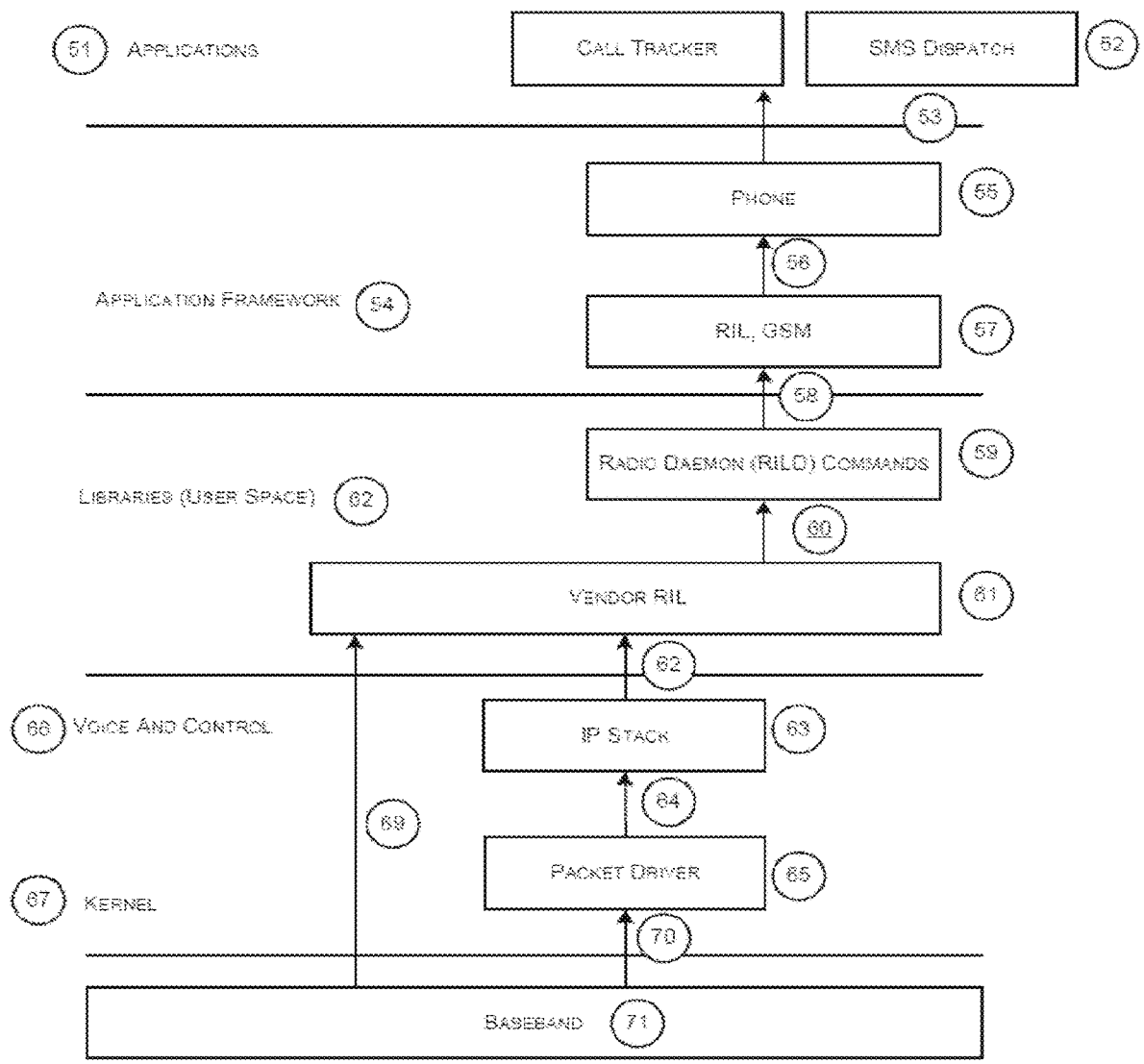
Figure 5:
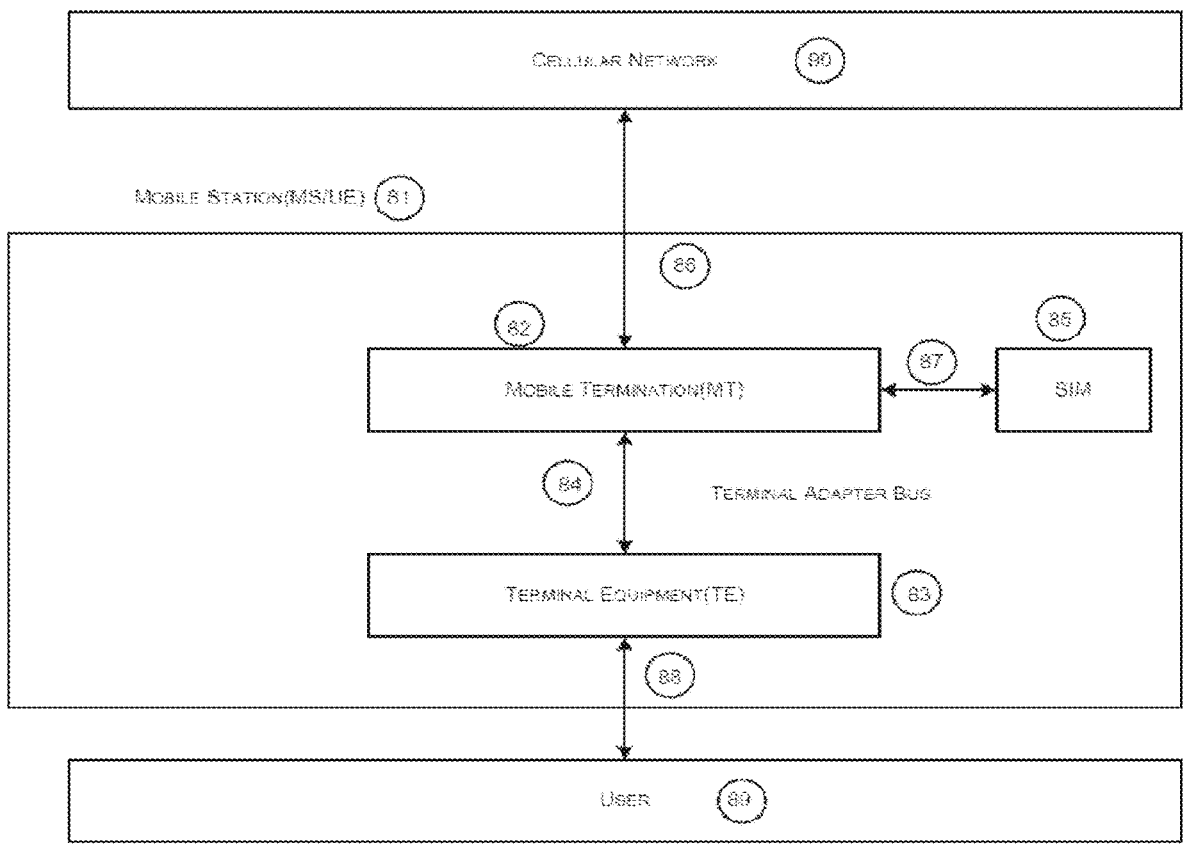
Figure 6:
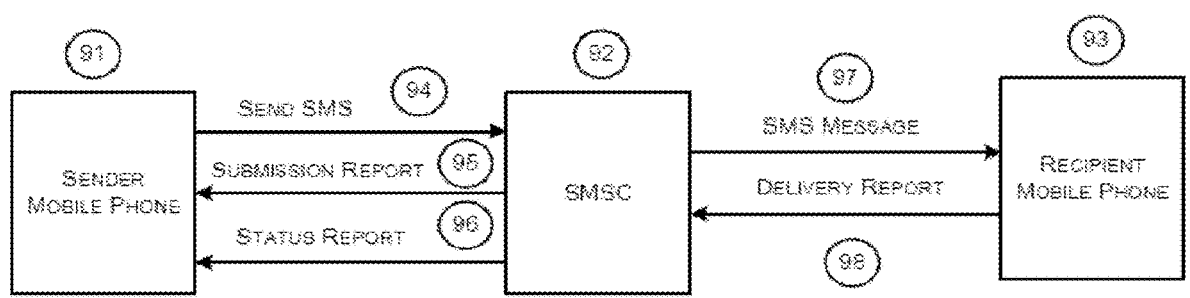

The foregoing shall be more apparent from the following more detailed description of the disclosure.

BRIEF DESCRIPTION OF THE INVENTION

In the following description, for explanation, various specific details are outlined in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

The ensuing description provides exemplary embodiments only and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail to avoid obscuring the embodiments.

Also, it is noted that individual embodiments may be described as a process that is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive like the term "comprising" as an open transition word without precluding any additional or other elements.

Reference throughout this specification to "one embodiment" or "an embodiment" or "an instance" or "one instance" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The terminology used herein is for the purpose of describing particular embodiments only and is not intended to be limiting disclosure. As used herein, the singular forms "a", "an", and "the" are intended to include the plural forms as well, unless the context indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

The various embodiments throughout the disclosure will be explained in more detail with reference to FIGS. 7-13.

Figure 7:
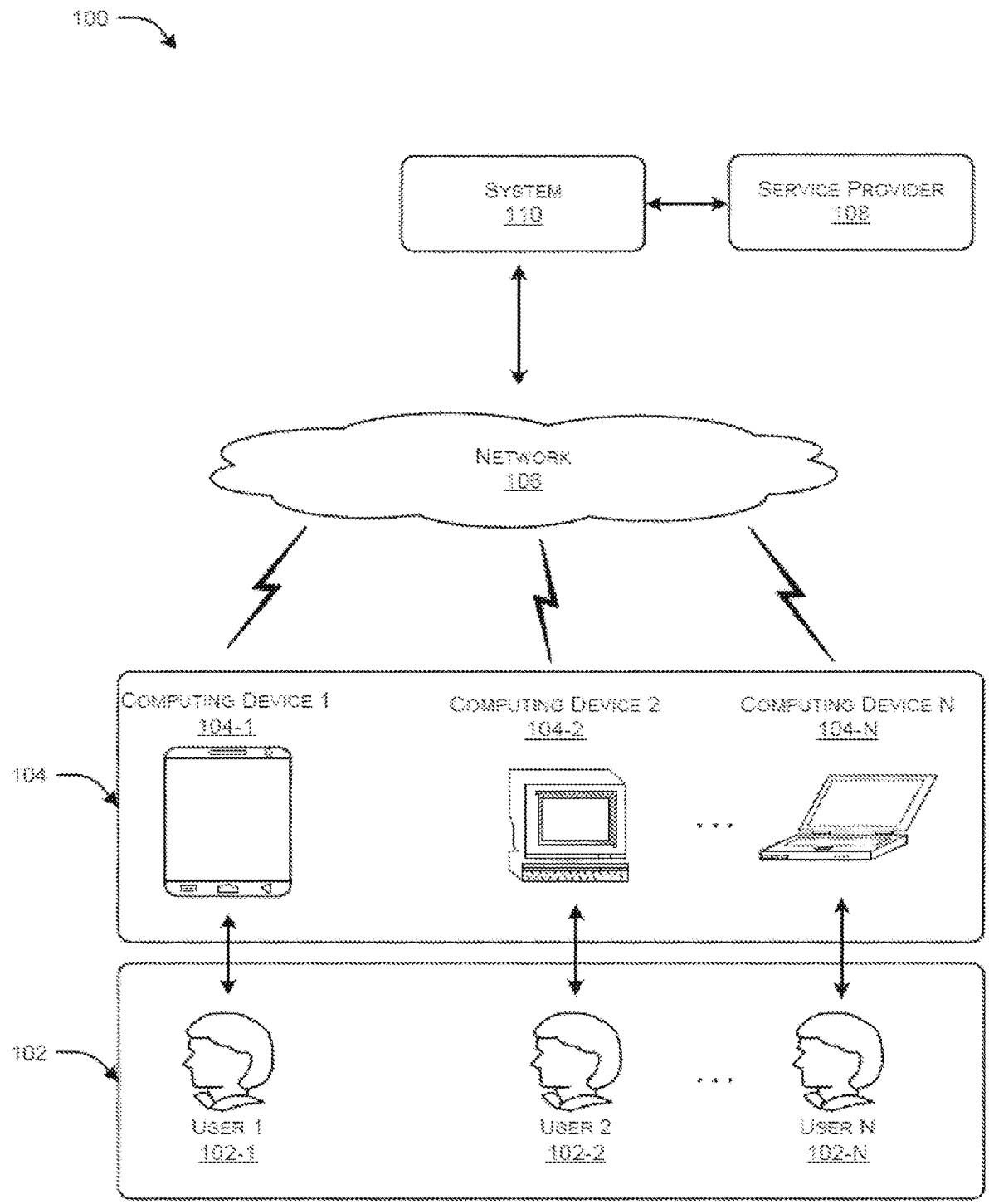
FIG. 7 illustrates an exemplary network architecture (100) of a proposed system (110), in accordance with an embodiment of the present disclosure.

FIG. 7 illustrates an exemplary network architecture (100) of a proposed system (110), in accordance with an embodiment of the present disclosure. As illustrated in FIG. 7, a plurality of computing devices (104-1, 104-2 . . . 104-N), herein referred to as computing devices (104), may be connected to a system (110). The computing devices (104) may also be known as user equipment (UE) that may include, but not be limited to, a mobile, a laptop, etc. Further, the computing devices (104) may include one or more in-built or externally coupled accessories including, but not limited to, a visual aid device such as a camera, audio aid, microphone, or keyboard. The computing devices (104) may include a mobile phone, smartphone, virtual reality (VR) devices, augmented reality (AR) devices, a laptop, a general-purpose computer, a desktop, personal digital assistants, a tablet computer, and a mainframe computer. Additionally, input devices for receiving input from a user (102) such as a touchpad, touch-enabled screen, electronic pen, and the like may be used.

A person of ordinary skill in the art will appreciate that the computing devices or UEs (104) may not be restricted to the mentioned devices and various other devices may be used.

Referring to FIG. 7, the exemplary network architecture (100) may include a plurality of users (102-1, 102-2 . . . 102-N) (collectively referred to as users (102)) associated with the plurality of computing devices (104). The computing devices (104) may be connected to the system (110) through a network (106). The system (110) may transmit one or more digitally signed requests to a service provider (108) through the network (106). The one or more digitally signed requests may be indicative of one or more services requested by the one or more users (102) through the one or more computing devices (104). The service provider (108) may provide a one-time password (OTP) in response to the one or more digitally signed requests.

In an exemplary embodiment, the network (106) may include, by way of example but not limitation, at least a portion of one or more networks having one or more nodes that transmit, receive, forward, generate, buffer, store, route, switch, process, or a combination thereof, etc. One or more messages, packets, signals, waves, voltage or current levels, some combination thereof, or so forth may be included by the one or more nodes. The network (106) may include, by way of example but not limited, one or more of a wireless network, a wired network, an internet, an intranet, a public network, and a private network. Further, the network (106) may include a packet-switched network, a circuit-switched network, an ad hoc network, an infrastructure network, a public-switched telephone network (PSTN), a cable network, a cellular network, a satellite network, a fiber optic network, or some combination thereof.

In accordance with embodiments of the present disclosure, the OTP may be sent by the service provider (108) through a mobile network operator (MNO) (not shown in FIG. 7). The MNO may convert the OTP to a Class 2 SMS to avoid direct display or storage of SMS to the users (102). Further, the MNO may convert the OTP to an SMS to be accessed by the system (110).

In an embodiment, the system (110) may include one or more public key infrastructure (PKI) enabled cryptography features such as a SIM card that may process the SMS from the MNO. Further, the SIM card may include an embedded SIM such as an e-SIM card or a normal SIM card.

Further, the system (110) may use one or more techniques such as any or a combination of one or more asymmetric key cryptography, one or more digital signatures, and one or more X 5.09 certificates to process the SMS received from the MNO.

In an exemplary embodiment, the system (110) may incorporate a SIM card enabled with public key infrastructure (PKI) to mitigate the security vulnerabilities in the existing OTP delivery mechanism where the OTP is sent in plain text, and the OTP reaches to users (102) without any prior authentication. Additionally, the system (110) may have cryptographic operational features including on-board key generation, signing, storage (of the key pairs), and the like. The MNO may convert the OTP to a Class-2 SMS to avoid direct display or storage of SMS to the users (102). Additionally, the PKI-enabled SIM cards may contain a valid certificate from any certificate authority (CA) before entering the processing of the SMS.

Figure 8:
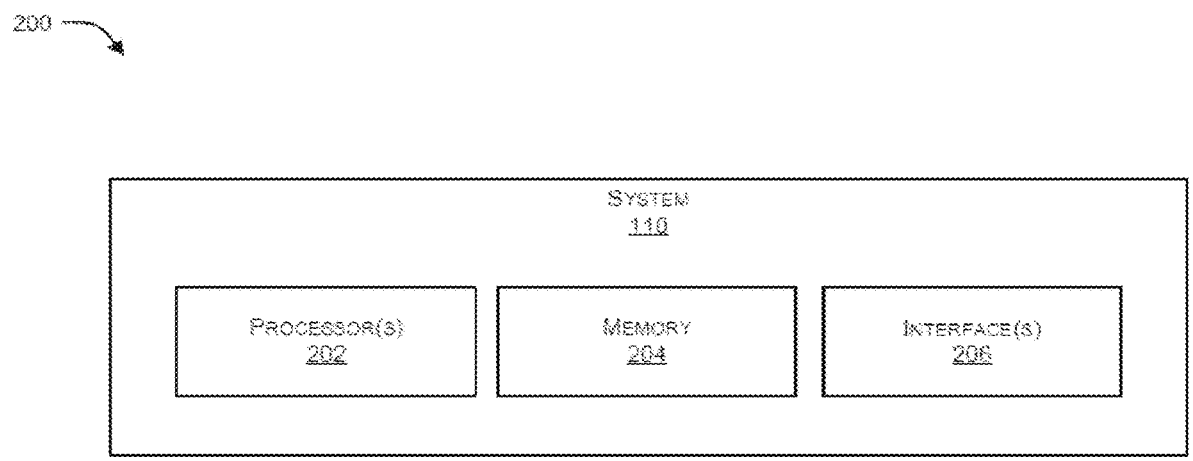
FIG. 8 illustrates an exemplary representation (200) of a proposed system (110), in accordance with an embodiment of the present disclosure.

FIG. 8 illustrates an exemplary representation (200) of the proposed system (110), in accordance with an embodiment of the present disclosure.

Referring to FIG. 8, the system (110) may comprise one or more processor(s) (202). The one or more processor(s) (202) may be implemented as one or more microprocessors, microcomputers, microcontrollers, digital signal processors, central processing units, logic circuitries, and/or any devices that process data based on operational instructions. Among other capabilities, the one or more processor(s) (202) may be configured to fetch and execute computer-readable instructions stored in a memory (204) of the system (110). The memory (204) may be configured to store one or more computer-readable instructions or routines in a non-transitory computer-readable storage medium, which may be fetched and executed to create or share data packets over a network service. The memory (204) may comprise any non-transitory storage device including, for example, volatile memory such as random-access memory (RAM), or non-volatile memory such as erasable programmable read-only memory (EPROM), flash memory, and the like.

In an embodiment, the system (110) may include an interface(s) (206). The interface(s) (206) may comprise a variety of interfaces, for example, interfaces for data input and output devices, referred to as input/output (I/O) devices, storage devices, and the like. The interface(s) (206) may facilitate communication through the system (110). The interface(s) (206) may also provide a communication pathway for one or more components of the system (110).

In an embodiment, the one or more processors (202) may transmit one or more digitally signed requests to a service provider (108) through a network (106). Further, the one or more digitally signed requests transmitted by the one or more processors (202) may comprise any or a combination of one or more encryption standards associated with the one or more digitally signed requests. Furthermore, the one or more digitally signed requests may be indicative of one or more services requested by the users (102) through the computing devices (104). Additionally, the one or more processors (202) may receive one or more encrypted messages from the service provider (108). The one or more encrypted messages may be generated by the service provider (108) based on the one or more digitally signed requests. Further, the one or more processors (202) may authenticate the users (202) based on the one or more encrypted messages from the service provider (108). Further, the one or more processors (202) may use one or more keys and authenticate the users (102). Furthermore, the one or more keys may include one or more pins set by the users (102). The one or more processors (202) may decrypt the one or more encrypted messages from the service provider (108) using one or more techniques, and generate one or more decrypted messages. The one or more processors (202) may use any or a combination of one or more asymmetric key cryptography, one or more digital signatures, and one or more X 5.09 certificates to generate the one or more secure messages for transmission to the users (102) based on the one or more decrypted messages. Additionally, the one or more processors (202) may include one or more public key infrastructure (PKI) enabled features to generate and provide the one or more secure messages to the users (102).

In an embodiment, the service provider (108) may validate the one or more digitally signed requests from the one or more processors (202) using a public key and a valid digital certificate. Further, the service provider (108) may include a certificate authority/public key infrastructure (CA/PKI) infrastructure to generate the one or more encrypted messages. Furthermore, the one or more encrypted messages from the service provider (108) may be generated using elliptical curve cryptography (ECC) encryption standard.

In an embodiment, the one or more processors (202) may receive the one or more encrypted messages from the service provider (108) through an MNO. The MNO may be configured to process the one or more encrypted messages from the service provider (108), and generate and/or provide one or more SMS to the one or more processors (202). Further, the MNO may be configured to generate one or more Class 2 SMS to the one or more processors (202).

Figure 9:
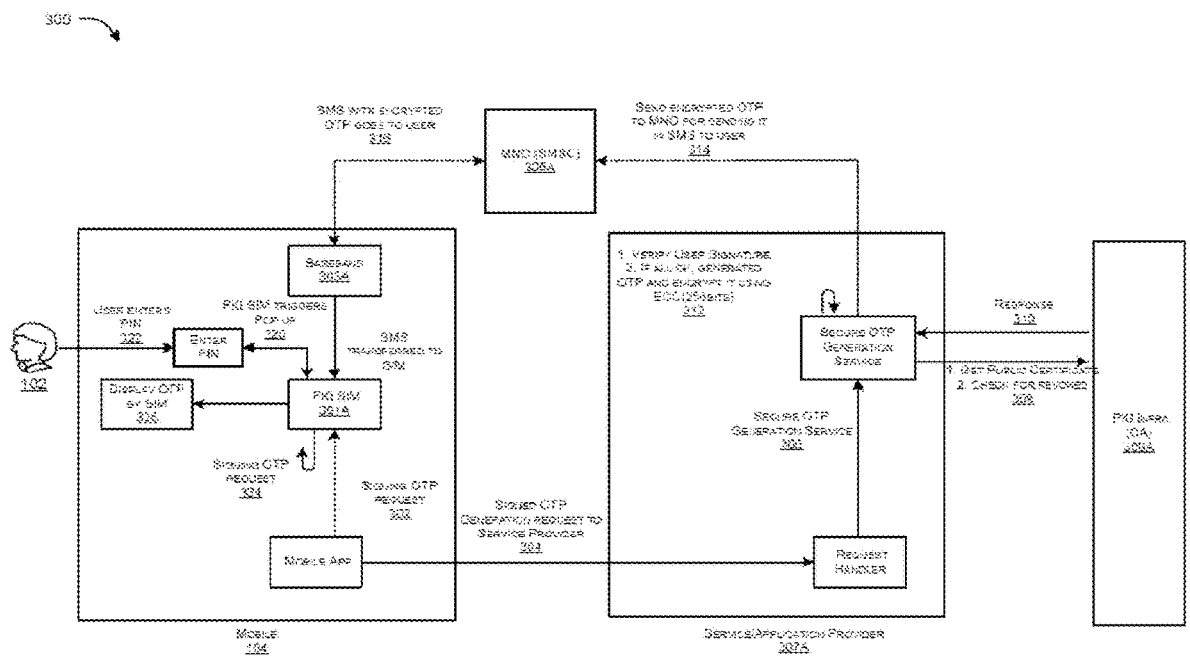
FIG. 9 illustrates an exemplary block diagram representation (300) of a proposed system (110), in accordance with an embodiment of the present disclosure.

FIG. 9 illustrates an exemplary block diagram representation (300) of the proposed system (110), in accordance with an embodiment of the present disclosure.

As illustrated in FIG. 9, the system (110) may include a computing device (104) associated with a user (102). A person of ordinary skill in the art will understand that the user (102) and the computing device (104) depicted in FIG. 9 are similar in their functionality to the user(s) (102) and the computing device(s) (104) of FIG. 7, respectively, and hence, may not be described in detail again for the sake of brevity.

Referring to FIG. 9, the computing devices (104) may communicate with a server such as an MNO or an SMSC (305A) associated with a service or an application provider (307A) and a PKI Infrastructure (309A). It will be appreciated that the service or application provider (307A) may be similar in its functionality to the service provider (108) of FIG. 7, and hence, may not be described in detail again for the sake of brevity. Further, the computing devices (104) may include a PKI SIM (301A), a mobile application (optional), and a baseband module (303A). The steps involved in getting a secured OTP may be as follows:

Step 302: The user (102) may initiate an OTP request by using their target mobile application/web application. If the browser is linked or can communicate with a mobile SIM, the OTP request may be either digitally signed or encrypted or both. So, the trigger/initiation type may be one of the following:
Digital Signature
Encryption
Digital Signature as well as encryption
Plain text
Based on the trigger/initiation type, the next set of steps may be followed.

Step 304: The secure OTP generation request (signed or unsigned, encrypted or plain text) may be forwarded to the corresponding service provider's request handler. The "OTP generation request" optionally may be a "digitally signed request" to ensure that the request originated from a legitimate user (102) who possesses a valid digital certificate. The encryption process may also be optional, but if added, may ensure data confidentiality.

Step 306: The request handler at the service provider (307A) may forward the request to its internal/third-party secure OTP generation service.

Steps 308 and 310: Secure OTP generation service by the service provider (307A) may include communication to a certification authority/public key infrastructure (CA/PKI) infrastructure (309A) to get a public key certificate or to validate the certificate. If the request is already encrypted, the service provider (307A) may decrypt and extract the request information in plain text. In the case of a symmetric key-based system where keys are pre-agreed or shared by secure means, steps 308 and 310 may not be followed.

Step 312: The service provider (307A) may verify the signatures of the user (102) over the OTP request and generate an OTP in the next sub-step. Once the OTP request is validated, the service provider (307A) may generate the encrypted OTP using ECC (256 bits, 64 printable characters)/Symmetric 128/256 advanced encryption service (AES) with the public key of the specific recipient that ensures only that specific recipient can decrypt the OTP). The service provider (307A) also keeps the plain text OTP in its database or memory, which would be then utilized to verify the OTP at a later stage.

Step 314: Encrypted or secure OTP may be sent to the MNO/SMSC (305A), SMS gateway/third-party. The MNO/SMSC (305A) may convert the encrypted OTP into standard SMS format (i.e., unicode characters) or parse the incoming packet (from third-party data or API) to get the content of the SMS.

Step 316: From MNO/SMSC (305A), the encrypted SMS may be delivered to the intended recipient through the MNOs telecommunications network.

Step 318: On reaching the computing device (104), based on the class/type of SMS, the encrypted SMS may be directly downloaded/saved into a SIM card. Further, the secure messaging STK applet subscribed to the SMS peer-to-peer (SMS-PP) download event may receive the SMS content.

Step 320: Secure messaging subscriber application tool kit (STK) card applet may generate a pop-up for receiving inputs from the users (102) (for PKI SIM PIN) as authentication to initiate the decryption process.

Steps 322 and 324: The users (102) may enter the PIN, where the PIN may be validated.

Step 326: If PIN validation is successful, then PKI SIM (301A) may decrypt the OTP and display the plain text OTP to the users (102) triggering proactive commands to display the message. Now, the users (102) may be able to see their OTP and provide the same in the target application/service. Only a legitimate user having information about SIM PIN would be able to decrypt the OTP and get a clear text OTP from this method. In this way, SIM swap attacks can also be averted with this scheme.

Figure 10:
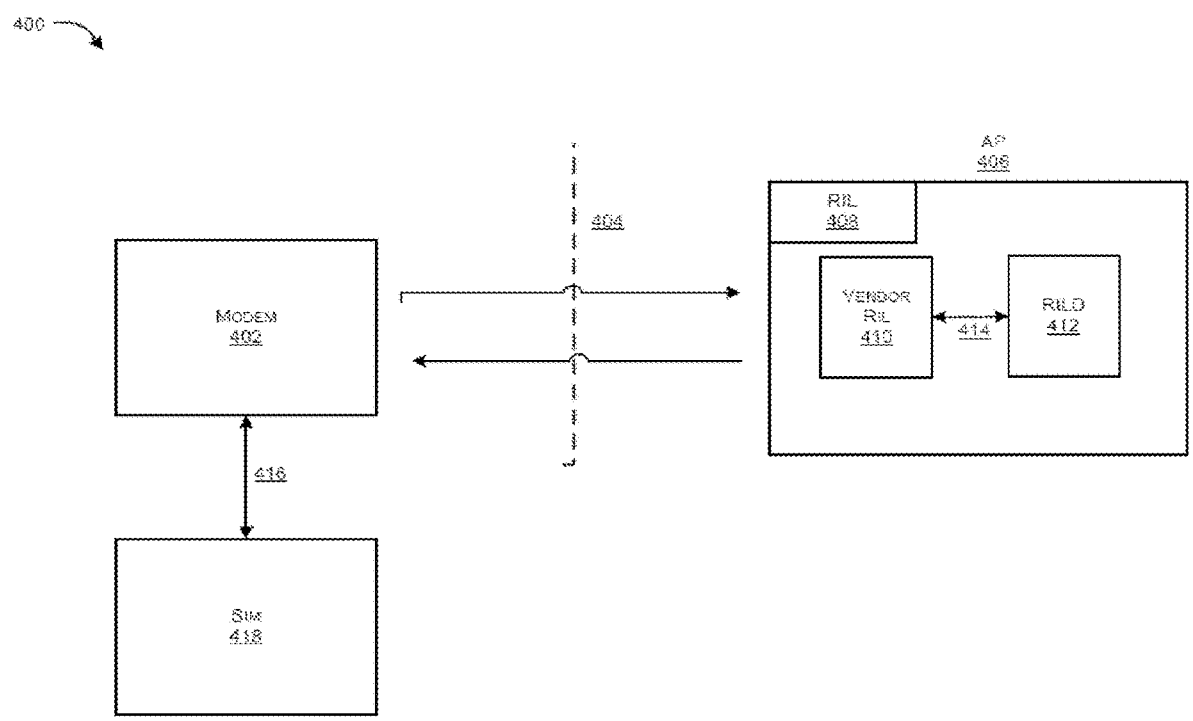
FIG. 10 illustrates an exemplary component arrangement in mobile equipment (400) of a proposed system (110), in accordance with an embodiment of the present disclosure.

FIG. 10 illustrates an exemplary component arrangement in mobile equipment (400), in accordance with an embodiment of the present disclosure. As illustrated, a modem or terminal (402) is a specialized component in the communication pipeline which takes care of communication between a host operating system (OS)/device (406) and a SIM card (418). The modem or the terminal (402) may directly communicate with the SIM card (418) using a half-duplex communication with ISO7816 protocol. The modem (402) may receive data from an antenna over radio frequency communication. Once the data is received at the modem, the received analog signal may go through digital conversion and other processes to get information. Whenever the modem has some data or information, it may pass on the data or information to the host system (application processor) (406) over a serial/UART communication (404), a vendor-specific radio interface layer (408), and a radio interface layer daemon (412).

In an exemplary implementation, the modem or terminal (402) needs to be told either by the host system (406) or by the SIM card (418) to perform a certain activity. The communication between the modem/terminal and host system (406) as well as between modem/terminal (402) and SIM (418) is a two-way half duplex protocol. The SIM card (418) may remain in slave mode and the baseband may act as a master that initializes and initiates the communication. Additionally, proactive commands and synthesis tool kit (STK) framework may enable the SIM card (418) to send a command by itself in response to the earlier command sent by the modem (402).

Figure 11:
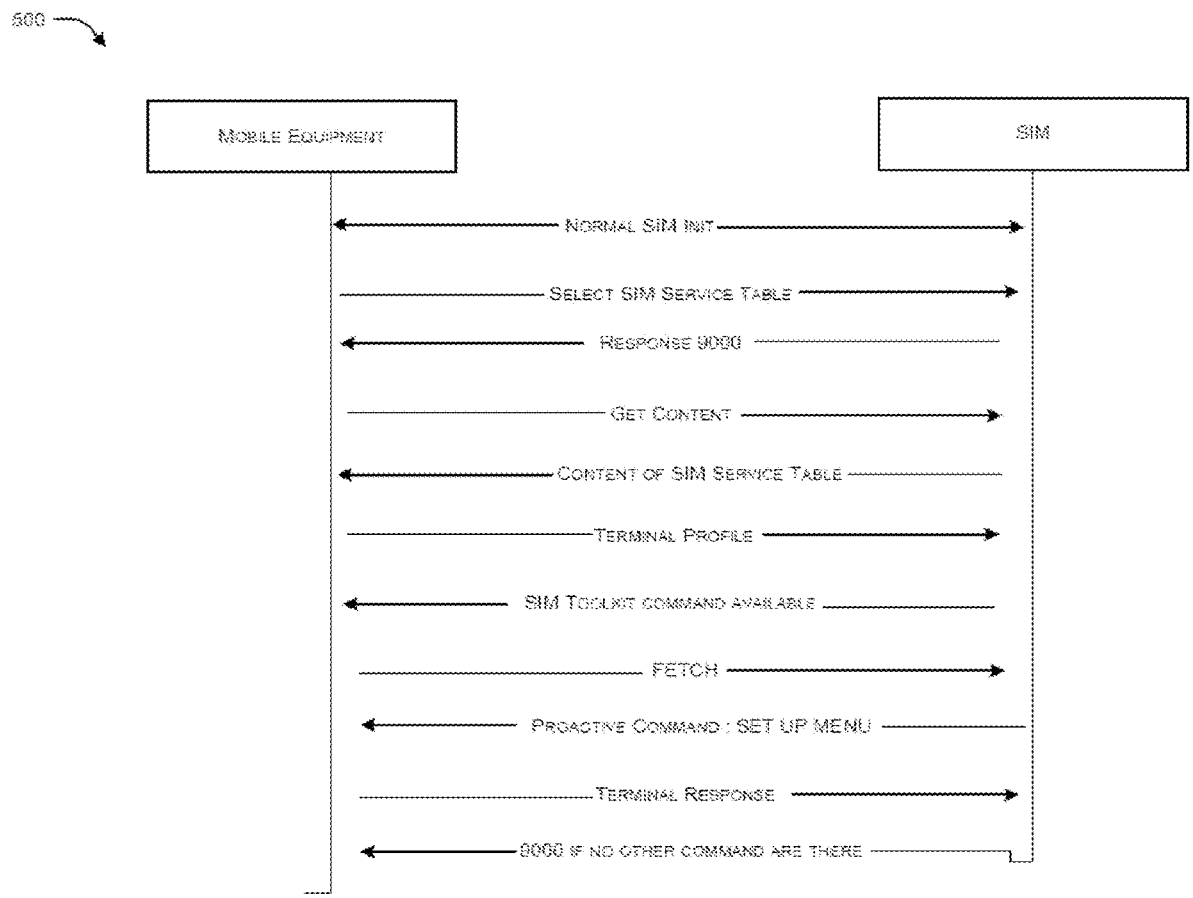
FIG. 11 illustrates an exemplary representation of a SIM Toolkit Initialization (500) of a proposed system (110), with one example command (SETUP MENU), in accordance with an embodiment of the present disclosure.

FIG. 11 illustrates an exemplary representation of a SIM Toolkit Initialization (500) of the system (110), with one example command (SETUP MENU), in accordance with an embodiment of the present disclosure.

In an exemplary implementation, to allow mobile network operators to add more subscriber identity module (SIM) card-oriented services, SIM toolkit standards may be used. Contrary to normal SIM applications or applets, the SIM toolkit applications or applets have the facility to communicate with the users (102). The SIM toolkit applets are also capable of sending proactive commands. Proactive commands are a way by which a smart card can send a command to the terminal with a specific job request. The smart card mostly works in slave mode where the smart card accepts commands and sends responses back to the master i.e., the terminal. However, with the help of proactive commands supported by the STK framework, the SIM card can also initiate a command to display certain text on the mobile equipment screen or it can also send an SMS. Further, the SIM toolkit standard ETSI 11.14 may be used to provide interoperability across different mobile equipment.

There are some SIM toolkit-specific application protocol data units (APDU) that are specified by certain standards, for example

TERMINAL PROFILE
ENVELOPE
FETCH
TERMINAL RESPONSE

The SIM card may have a SIM service table (SST) which contains a list of services supported as well as enabled/disabled services. The same list of services is used by the terminal to understand the kind of services SIM card supports. Further, the SIM card holds subscriber information, MNO-specific cryptographic keys, algorithms, etc. The very first task after user equipment (UE) is turned ON is to go for SIM initialization so that the user equipment can connect to the mobile network operator MNO.

As illustrated in FIG. 11, once the basic SIM initialization is completed, the terminal requests for a SIM service table (SST) from SIM. The SST is an EF (6F 38 Short file ID) on the SIM card. This service table is used to control the services to be used by the mobile terminal.

APDU to select SST

| 00 | A4 | 00 | 04 | 02 | 6F | 38 |
|----|----|----|----|----|----|----|

Response
61 XX
Read Binary

| 00 | B0 | 00 | 00 | XX |
|----|----|----|----|----|

Response is SST
Example: FF 33 FF FF 3F F0 3F

Once the mobile equipment or terminal gets the SIM service table, the terminal sends its capabilities to the SIM. This helps a proactive SIM card to know about the capabilities of the mobile terminal in which it is to be used. SIM cards can use this information to control the activities between proactive SIM and the mobile equipment. TERMINAL PROFILE command is used by the terminal to send terminal capabilities or profiles to the SIM card.

TERMINAL PROFILE APDU

| 80 | 10 | 00 | 00 | Lc | DATA |
|----|----|----|----|----|------|

Response
A proactive command if available.

The concept of delivering secured OTP to a user after proper authentication makes use of the following frameworks (although not limited to)

Backend public key infrastructure (PKI) Infrastructure/Security framework (may be symmetric or proprietary).
Capable of sending special class/type of SMS.
Capable of processing special classes/types of SMS by the baseband and taking actions.

SIM/universal integrated circuit card (UICC)/universal subscriber identity module (USIM) toolkit applet, and toolkit framework.

In an exemplary embodiment, the system (110) can use existing concepts or frameworks to achieve the goal of secure communication.

Figure 12:
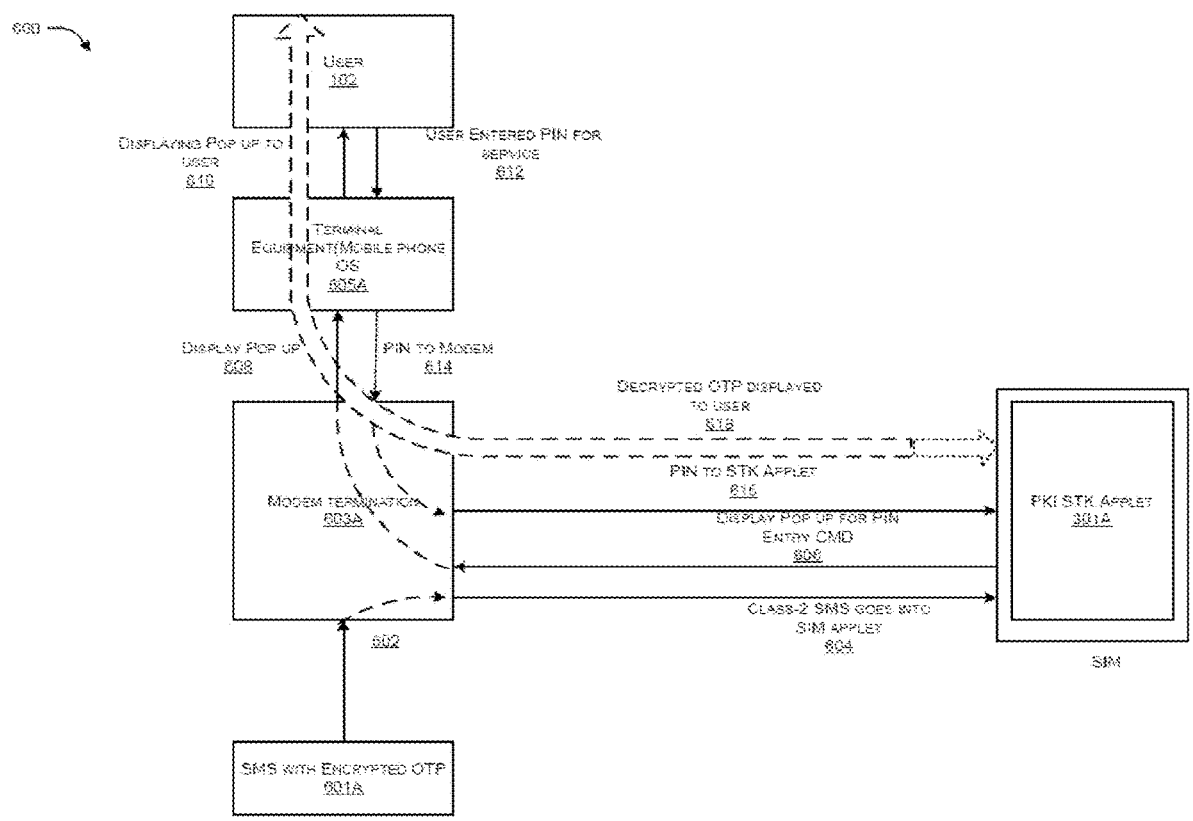
FIG. 12 illustrates an exemplary flow diagram of a secure OTP using STK functionality (600) of a proposed system (110), in accordance with an embodiment of the present disclosure.

FIG. 12 illustrates an exemplary flow diagram of a secure OTP using SIM application tool kit (STK) functionality (600) of the system (110), in accordance with an embodiment of the present disclosure.

As illustrated, a user (102) receives an encrypted OTP (601A) in his user device (605A) having a modem (603A) and a PKI STK applet (301A). The security of encrypted OTP is ensured and it is only visible to the user (102) after proper authentication. The following requirements are to be fulfilled to achieve the goal of secure OTP.

OTP should not reach directly to the user in plain text (Class 2 type SMS to be used).

OTP should not be visible (in plain text) to anyone in the communication channel to be encrypted.

Mechanism to authenticate the user while holding the OTP. Based on the outcome of authentication, OTP is either displayed or not displayed.

Cryptographic operations and storage should be in a tamper-resistant element to avoid any software (OS/Library etc.) vulnerabilities.

Communication between the hardware secure element and the user (102) is required.

As shown in FIG. 12, the encrypted OTP (601A) in SMS reaches the mobile equipment/mobile termination (602). Based on certain parameters of the received SMS, it is routed to a SIM card (604). A special customized STK application or applet may be subscribed for the reception of such messages in a SIM card.

The modem termination (603A) uses the communication such as GSMENVELOP commands to download SMS data in a trigger sent to the secure messaging applet. The event handler of the customized secure messaging subscriber application tool kit (STK) applet (301A) receives the envelope, gets the SMS, and parses it to extract various fields, more importantly, the encrypted OTP. To decrypt the extracted encrypted OTP, a user PIN is required. So, the PKI STK applet (301A) sends a request to the terminal equipment (605A) to display the UI to a user where he can enter his PIN. This is achieved using the concept of proactive commands where a command is sent as a response to the terminal, and the terminal takes action against the command and sends a response back to the SIM card.

The user-entered PIN is received and sent to the terminal equipment (605A). Now, the terminal equipment (605A) sends the PIN in response to the proactive command sent by SIM in the previous step. Since the STK applet receives the user PIN, the PKI STK applet (301A) is required to perform certain operations like encryption/decryption. The encrypted OTP now gets decrypted and the PKI STK applet (301A) asks the terminal equipment (605A) to display the same to the user in another proactive command. If the entered PIN is not correct and the number of allowed attempts are exhausted, the session expires. Hence, an encrypted OTP is delivered to an authenticated user and SIM swap attacks are prevented.

Figure 13:
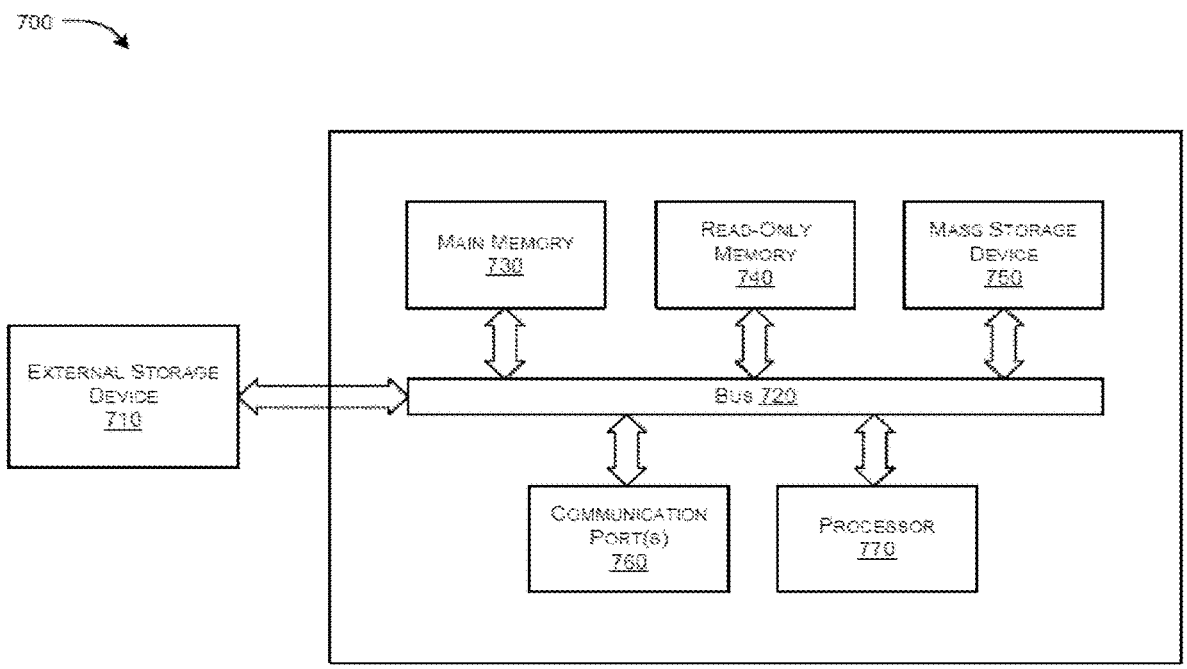
FIG. 13 refers to an exemplary computer system (700) in which or with which embodiments of the present disclosure may be implemented.

FIG. 13 refers to the exemplary computer system (700) in which or with which embodiments of the present disclosure may be implemented.

As shown in FIG. 13, the computer system (700) may include an external storage device (710), a bus (720), a main memory (730), a read-only memory (740), a mass storage device (750), a communication port(s) (760), and a processor (770). A person skilled in the art will appreciate that the computer system (700) may include more than one processor and communication ports. The communication port(s) (760) may be chosen depending on a network, such as a Local Area Network (LAN), Wide Area Network (WAN), or any network to which the computer system (700) connects. The main memory (730) may be Random Access Memory (RAM), or any other dynamic storage device commonly known in the art. The read-only memory (740) may be any static storage device(s) e.g., but not limited to, a Programmable Read Only Memory (PROM) chip for storing static information e.g., start-up or basic input/output system (BIOS) instructions for the processor (770). The mass storage device (750) may be any current or future mass storage solution, which can be used to store information and/or instructions.

The bus (720) may communicatively couple the processor(s) (770) with the other memory, storage, and communication blocks. The bus (620) may be, e.g., a Peripheral Component Interconnect (PCI)/PCI Extended (PCI-X) bus, Small Computer System Interface (SCSI), universal serial bus (USB), or the like. The bus (720) may further include connecting expansion cards, drives, and other subsystems as well as other buses, such the front side bus (FSB), which connects the processor (770) to the computer system (700).

Optionally, operator and administrative interfaces, e.g., a display, keyboard, and cursor control device may also be coupled to the bus (720) to support direct operator interaction with the computer system (700). Other operator and administrative interfaces can be provided through network connections connected through the communication port(s) (760). In no way should the aforementioned exemplary computer system (700) limit the scope of the present disclosure.

While considerable emphasis has been placed herein on the preferred embodiments, it will be appreciated that many embodiments can be made and that many changes can be made in the preferred embodiments without departing from the principles of the disclosure. These and other changes in the preferred embodiments of the disclosure will be apparent to those skilled in the art from the disclosure herein, whereby it is to be distinctly understood that the foregoing descriptive matter is to be implemented merely as illustrative of the disclosure and not as a limitation.

Advantages of the Invention

The present disclosure provides security against attacks such as subscriber identity module (SIM) swap attacks, etc.

The present disclosure provides protection against direct revealing of sensitive information such as one-time password (OTP) by enforcing another level of user authentication.

The present disclosure provides a system and a method that is mobile platform agnostic.

The present disclosure provides a system and a method that is easily pluggable with the existing infrastructure of telecommunication and information technology.

We claim:

1. A system for generating one or more secure messages, the system comprising:
one or more processors operatively coupled to one or more computing devices, wherein the one or more processors are coupled with a memory, and wherein said memory stores instructions which when executed by the one or more processors causes the one or more processors to:
  transmit one or more digitally signed requests to a service provider through a network, wherein the one or more digitally signed requests are indicative of one or more services requested by one or more users through one or more computing devices, and wherein the one or more computing devices comprise a subscriber identity module (SIM) card;
  receive one or more encrypted messages from the service provider, wherein the one or more encrypted messages are based on the one or more digitally signed requests;
  authenticate the one or more users based on the one or more encrypted messages received from the service provider, wherein the authentication is based on one or more keys, and wherein the one or more processors are configured to use public key infrastructure (PKI) enabled cryptography features of the SIM card to authenticate the one or more users;
  based on the authentication of the one or more users, decrypt the one or more encrypted messages received from the service provider using one or more techniques to generate one or more decrypted messages; and
  generate the one or more secure messages based on the one or more decrypted messages.

2. The system as claimed in claim 1, wherein the one or more techniques comprise any or a combination of asymmetric key cryptography, one or more digital signatures, and one or more X 5.09 certificates.

3. The system as claimed in claim 1, wherein the one or more decrypted messages comprise one or more plain text messages to be read by the one or more users.

4. The system as claimed in claim 1, wherein the service provider is configured to validate the one or more digitally signed requests and generate the one or more encrypted messages.

5. The system as claimed in claim 1, wherein the one or more encrypted messages are received from the service provider through a mobile network operator (MNO), and wherein the MNO is configured to process the one or more encrypted messages and generate one or more short message service (SMS).

6. The system as claimed in claim 5, wherein the MNO is configured to generate one or more Class 2 SMS.

7. The system as claimed in claim 1, wherein the one or more digitally signed requests are associated with one or more encryption standards.

8. The system as claimed in claim 1, wherein the one or more keys comprise one or more personal identification numbers (PINs) set by the one or more users.

9. The system as claimed in claim 1, wherein the service provider is configured to validate the one or more digitally signed requests using a public key and a valid digital certificate.

10. The system as claimed in claim 1, wherein the service provider comprises a certificate authority/public key infrastructure (CA/PKI) to generate the one or more encrypted messages.

11. The system as claimed in claim 1, wherein the one or more encrypted messages received from the service provider are generated using an elliptical curve cryptography (ECC) encryption standard.

12. A method for generating one or more secure messages, the method comprising:
  transmitting, by one or more processors, one or more digitally signed requests to a service provider through a network, wherein the one or more digitally signed requests are indicative of one or more services requested by one or more users through one or more computing devices, and wherein the one or more computing devices comprise a subscriber identity module (SIM) card;
  receiving, by the one or more processors, one or more encrypted messages from the service provider, wherein the one or more encrypted messages are based on the one or more digitally signed requests;
  authenticating, by the one or more processors, the one or more users based on the one or more encrypted messages received from the service provider, wherein the authentication is based on one or more keys and includes using public key infrastructure (PKI) enabled cryptography features of the SIM card to authenticate the one or more users;
  decrypting, by the one or more processors, based on the authentication, the one or more encrypted messages received from the service provider using one or more techniques and generating one or more decrypted messages; and
  generating, by the one or more processors, the one or more secure messages based on the one or more decrypted messages.

13. The method as claimed in claim 12, wherein the one or more techniques comprise any or a combination of asymmetric key cryptography, one or more digital signatures, and one or more X 5.09 certificates.

14. The method as claimed in claim 12, comprising transmitting, by the one or more processors, the one or more digitally signed requests associated with one or more encryption standards.

15. The method as claimed in claim 12, comprising validating, by the one or more processors, the one or more digitally signed requests, and generating, by the one or more processors, the one or more encrypted messages.

16. A user equipment (UE) for facilitating generation of one or more secure messages, said UE comprising:
  one or more processors communicatively coupled to one or more processors in a system, the one or more processors coupled with a memory, wherein said memory stores instructions which when executed by the one or more processors causes the UE to:
    transmit one or more digitally signed requests to a service provider through a network, wherein the one or more digitally signed requests are indicative of one or more services requested by one or more users associated with the UE,
  wherein the one or more processors are configured to:
    receive one or more encrypted messages from the service provider, wherein the one or more encrypted messages are based on the one or more digitally signed requests;
    authenticate the one or more users based on the one or more encrypted messages received from the service provider, wherein the authentication is based on one or more keys, and wherein the one or more processors are configured to use public key infrastructure (PKI) enabled cryptography features of the SIM card to authenticate the one or more users;
    based on the authentication, decrypt the one or more encrypted messages received from the service provider using one or more techniques and generate one or more decrypted messages; and generate the one or more secure messages based on the one or more decrypted messages.

17. The UE as claimed in claim 16, comprising a subscriber identity module (SIM) card operably coupled to the one or more processors to enable the transmission of the one or more digitally signed requests to the service provider through the network.

18. A subscriber identity module (SIM) card in a user equipment (UE) for generating one or more secure messages, the SIM card comprising:
one or more processors operatively coupled to one or more processors in a system, wherein the one or more processors are coupled with a memory, and wherein said memory stores instructions which when executed by the one or more processors cause the one or more processors to:
transmit one or more digitally signed requests to a service provider through a network, wherein the one or more digitally signed requests are indicative of one or more services requested by one or more users associated with the UE;
receive one or more encrypted messages from the service provider, wherein the one or more encrypted messages are based on the one or more digitally signed requests;
authenticate the one or more users based on the one or more encrypted messages received from the service provider, wherein the authentication is based on one or more keys, and wherein the one or more processors are configured to use public key infrastructure (PKI) enabled cryptography features of the SIM card to authenticate the one or more users;
based on the authentication of the one or more users, decrypt the one or more encrypted messages received from the service provider using one or more techniques to generate one or more decrypted messages; and
generate the one or more secure messages based on the one or more decrypted messages.

* * * * *